G. H. Hurd,
Dental Impression Cup.
N°57,726. Patented Sep. 4, 1866.

Witnesses:
Geo. P. Cuthill Jr
Chas. M. Doyle

Inventor:
Geo. H. Hurd
by M. Randolph & Co. atty

UNITED STATES PATENT OFFICE.

GEORGE H. HURD, OF ST. LOUIS, MISSOURI.

IMPROVEMENT IN DENTAL MOLDS.

Specification forming part of Letters Patent No. 57,726, dated September 4, 1866.

*To all whom it may concern:*

Be it known that I, GEORGE H. HURD, of the city and county of St. Louis and State of Missouri, have invented a new and useful Improvement in Dental Impression-Cups, for the purpose of taking impressions of the dental arch of persons who are about to have artificial teeth inserted, but more especially for those persons whose gums are badly shaped and whose alveolar ridge has become wasted away by disease or other cause; and I do hereby declare that the following is a full and clear description thereof, reference being had to the accompanying drawings and to the letters of reference marked thereon.

Figure 1:
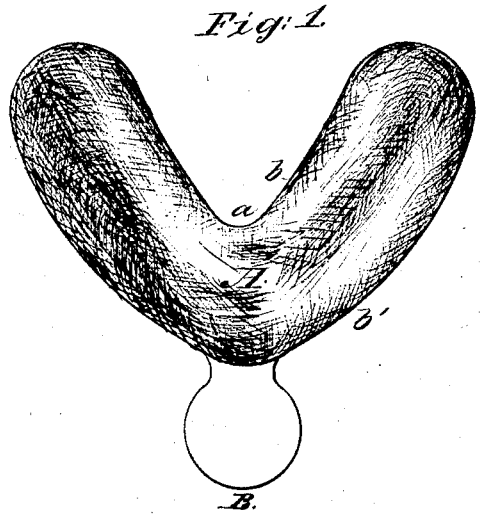
Figure 2:
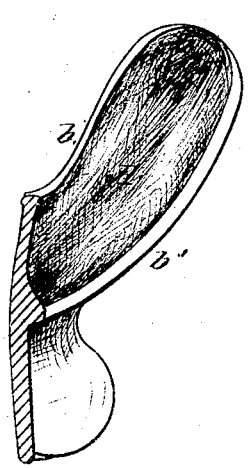
Figure 3:
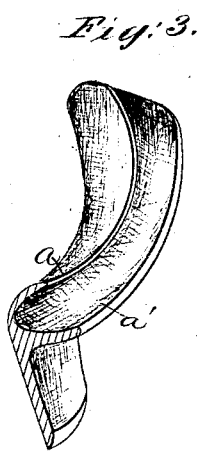

Figure 1 of the drawings is a plan of one of the improved molds. Fig. 2 is a sectional perspective view of a part of one, the section being taken on the line $a\,b$ in Fig. 1. Fig. 3 is a sectional perspective view of a part of one of the old molds, showing more clearly the nature of this improvement.

The nature of this invention conists in making the mold wide enough to take an impression of the muscular development of the lips for, say, one quarter of an inch, more or less, around the outside of the dental arch, and also for about the same distance inside of the dental arch of the inferior jaw, or that portion which forms the tongue-shelf.

Having made recent inventions and improvements in dental plates for artificial teeth, and made application for Letters Patent of the United States therefor, and as those plates are much wider and more flange-like than any plates now in use, and as it requires a different impression of the gums to construct those plates, the present invention is intended to supply that deficiency.

To enable those skilled in the art to make and use my improved molds or impression-frames, I will proceed to describe their construction and operation.

In the old molds, as shown in Fig. 3, there are two lips, $a\,a'$, about half an inch wide, more or less, turned up so as to form a deep concave groove between them, into which the wax or plaster is placed to take the impression of the gum. The width of the groove between the lips $a\,a'$ is only sufficient to cover the width of the dental arch.

In the new mold or impression-frame A the deep concave groove, above alluded to, is dispensed with, and the impression side of the mold or impression-frame is made just a trifle concave, say, one eighth of an inch, more or less, and the two edges of it, $b$ and $b'$, are widened out so as to be capable of taking an impression of the muscular development of the lips, about a quarter of an inch, more or less, around the outside of the dental arch, and also about the same distance inside of the dental arch or the tongue-shelf of the inferior jaw.

Having described my invention, what I claim is—

Constructing dental molds or impression-frames A so that their edges $b$ and $b'$ will be wide enough apart to take an impression of the lip-muscles and tongue-shelf at the same time, substantially as herein described and set forth.

GEO. H. HURD.

Witnesses:
M. RANDOLPH,
GEO. P. HERTHEL, JR.